Sept. 30, 1958          H. F. PEARSON          2,854,337
RASTER SCREEN AND A PROCESS FOR MAKING THE SAME
Filed Dec. 2, 1954                              3 Sheets-Sheet 1
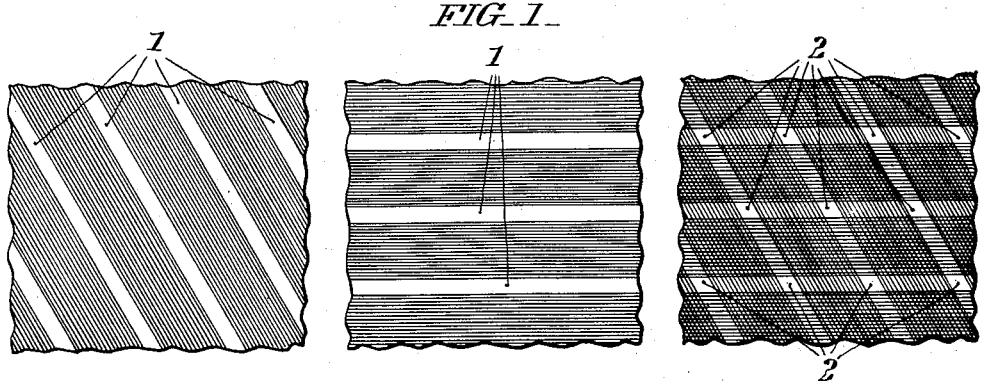
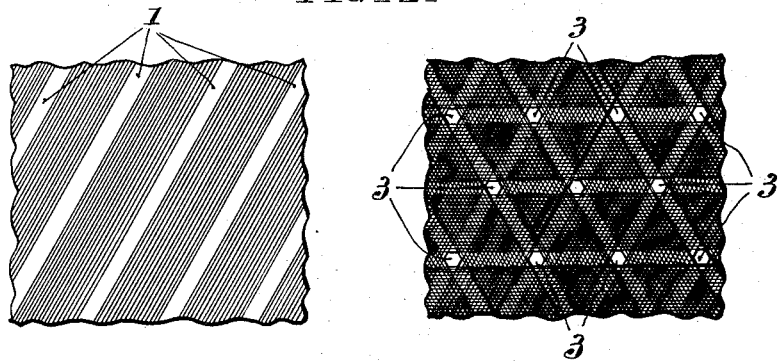
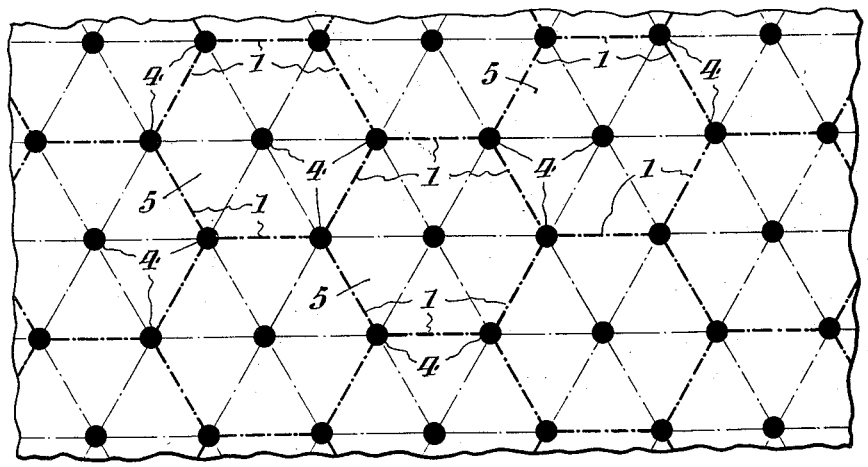
INVENTOR:
Henry F. Pearson,
BY Paul & Paul
ATTORNEYS.

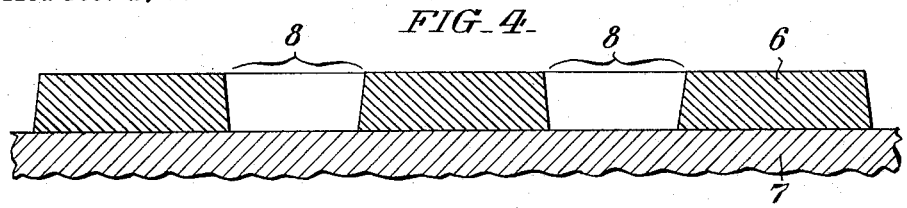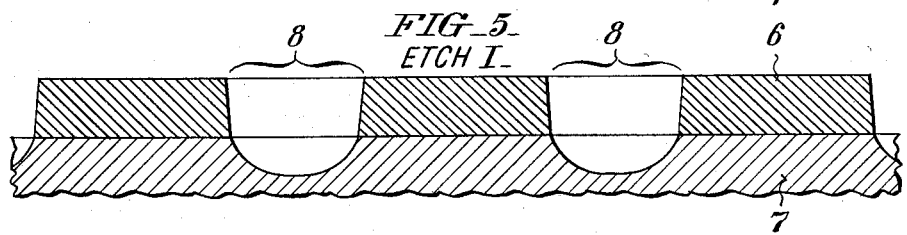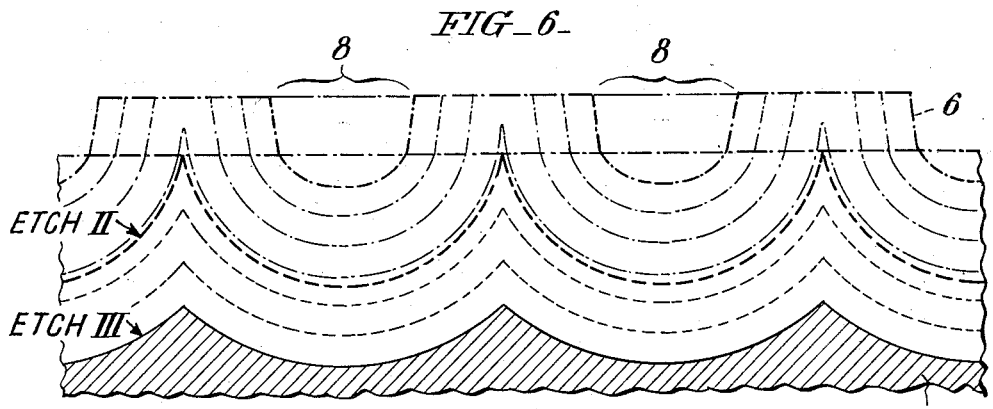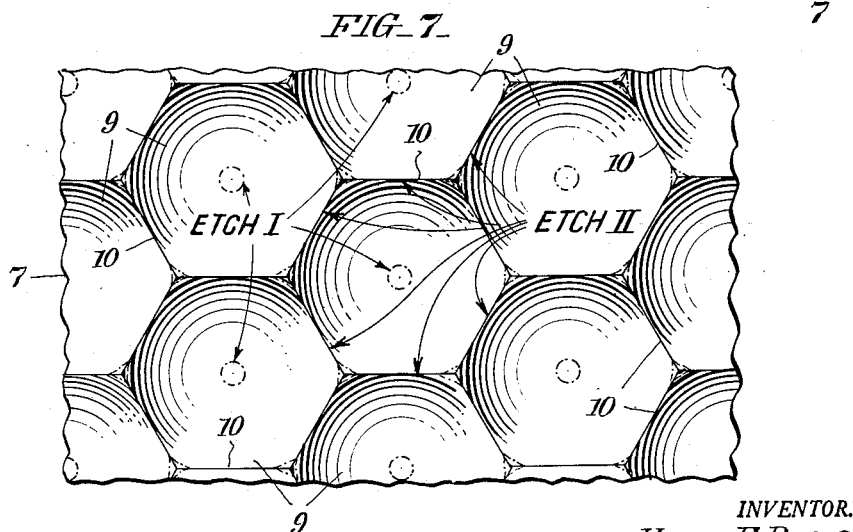

Sept. 30, 1958   H. F. PEARSON   2,854,337
RASTER SCREEN AND A PROCESS FOR MAKING THE SAME
Filed Dec. 2, 1954   3 Sheets-Sheet 3
*FIG_8_*
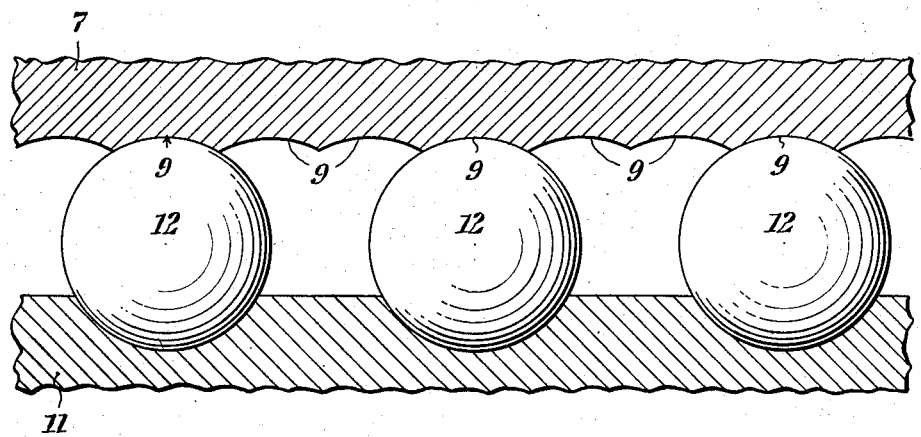
*FIG_9_*
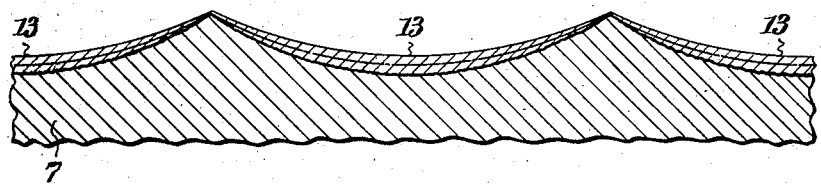
*FIG_10_*
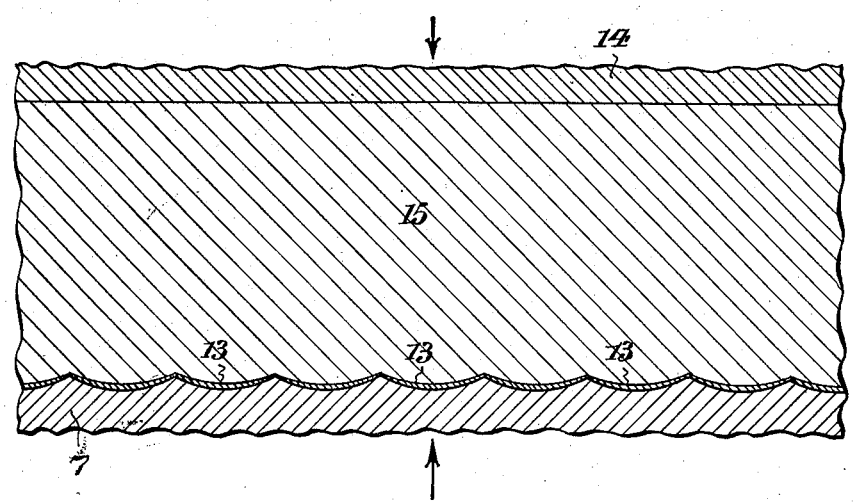
INVENTOR:
Henry F. Pearson,
BY Paul & Paul
ATTORNEYS.

United States Patent Office 2,854,337
Patented Sept. 30, 1958

2,854,337

RASTER SCREEN AND A PROCESS FOR MAKING THE SAME

Henry F. Pearson, Newtown, Pa.

Application December 2, 1954, Serial No. 472,588

5 Claims. (Cl. 96—38)

This invention relates to an improved raster screen and to a process for making the same.

Heretofore, it has been proposed, as, for example, in the art of producing stereoscopic pictures, to use as a part of the apparatus a screen having a relatively large number of very small lenses on the front surface whose foci fall on the rear surface which also may or may not be lenticular. Screens of this sort have consisted of a multitude of identical lenses which are circular, ribbed or cross ribbed. Circular lenses, even when arranged hexagonally, produce flat areas between them which diminish the overall efficiency of the screen. Further, circular lenses of such a size and critical design have not, so far, been satisfactorily produced. For example, when a mold is made by machining lenticular depressions in it, the grinding tool invariably dulls, producing lenses of enough variety to make them too inaccurate. Ribbed screens produce unilateral effects only, although greater accuracy is possible with them, and cross-ribbed screens present difficulties of two layers of screen, the outer layer of lenses being of a different focal length than the inner, and of lenses whose accuracy is only horizontal and vertical.

To be of greatest efficiency, a spherical section lens of a raster screen should use as few degrees of curvature as possible. Further, rather than being circles tangent to each other, the lenses should be cut with straight sides so that they fit together forming a completely lenticulated surface. Preferably, the lenses should fit together in a hexagonal pattern. A hexagon being more closely circular than a square, the points of jointure between three hexagonal lenses of spherical contour are much shallower than the similar points created between square lenses. Therefore, since the hexagonal lenses require fewer degrees of curvature at these points, the lenses of hexagonal arrangement are of greater efficiency. I have discovered a novel process for producing raster screens having hexagonal lenses in contact with each other, having also, a greater uniformity and accuracy than heretofore possible. The improved raster screen of the present invention and the process of producing it are illustrated in the accompanying drawings in which:

Figs. 1 and 2 are enlarged sections of linear half-tones to illustrate how, through them, a pattern of circular dots on the jointures of a pattern of equilateral triangles can be formed.

Fig. 3 is an enlarged view of a portion of a photographic plate covered with a uniform pattern made up of the pattern formed by the steps of Figs. 1 and 2.

Figs. 4, 5 and 6 consist of three sectional views of a metal plate emulsified with the pattern of Fig. 3 and etched through three stages to produce the desired pattern.

Fig. 7 is an enlarged view of the plate of Fig. 6 when etching is complete.

Fig. 8 is a sectional view of the optional hobbing method.

Fig. 9 is a sectional view of the optional coating method.

Fig. 10 is a sectional view of the master pressing made from the etched plate of Fig. 7.

The raster screen of the present invention contains a very large number of contiguous lenses, the order of magnitude being about 50 to 100 of such lenses per linear inch. It is not possible to form hexagons of this small size directly and to the degree of accuracy required where the ultimate screen is to be used optically. I have found that the process of the present invention provides a satisfactory way to form a raster screen made of a plastic material or the like and having accurately formed contiguous lenses of this size.

To produce a pattern of dots large enough and accurate enough is relatively simple, although great precision is necessary. Many engraving houses have half-tone linear screens. A screen having spaced lines, preferably of coarse scale, for example 20 lines to the inch with lines that are narrow in relation to the space between them, is required. From this, two glass-plate negatives are made as shown in Fig. 1. The lines 1 are clear and the space between them is developed and is opaque. Placing these emulsion against emulsion and the lines of one at exactly 60° to the lines of the other, the assembly is opaque except at the inter-sections of the clear lines where minute apertures 2 are formed. These minute apertures, diamond shaped, are thereby disposed at the jointures of an overall pattern of equilateral triangles. This is then photographed, appearing on the new plate as minute, diamond shaped, black dots. A negative plate creates, therefore, a precise duplication of the assembled pattern. One of the original glass plates of Fig. 1 is then laid on this, emulsion to emulsion and at 60° in the opposite sense from at first so that the acute corners of the diamond shapes are cut off, forming hexagonal apertures 3 as in Fig. 2. From this second assembly a final plate is made. Here, by slight off-focus and great contrast, the hexagonal apertures are cast on the final emulsion in the form of sharp and perfect circles.

From the negative thus created, a positive print of white dots is made. This is carefully blocked out, following the dot pattern, into a perfect rectangle of desired size. It is then photographically reduced to the scale required (say 65 dots to the linear inch) and photographed onto an emulsified copper plate which is then etched by the normal engraving methods. A print from this plate produces black dots, now perfectly round and of correct size and spacing. By the step and repeat process, this small and perfect sample is repeated over on a surface so that the joints between samples are perfect, dot for dot, and the pattern is extended to a size of the final platen, say, to 20" x 25".

The foregoing steps produce an accurate pattern of circular pin-point dots 4 placed at the jointures of an overall pattern of equilateral triangles 5 as shown in Fig. 3. By normal photo-engraving processes, this pattern is then transferred to a metal plate (Fig. 4) of very fine-grained metal, such as best quality copper, on which it appears as an emulsion 6 covering the metal surface 7 except for the dots 8 which are not emulsified. The emulsion 6 is then hardened by heat to become a very adherent, brittle film. If during subsequent etching this film is marred or broken, it can be removed and replaced by another film on the unetched surfaces remaining.

This plate is then subjected to a most careful acid-etching process, described hereafter as the three etches, and in this application, considered to be novel and my invention.

The whole etching process is done in short intervals between which the plate is removed, cleaned, dried and examined by a half-tone depth gauge and a microscope to keep accurate control of the action. The acid is projected against the plate, set face down above a spray in a closed tank, with enough force to wash away equally, from each dot, and from the entire area of dots, the acid which has already reacted with the metal. In other words, all unemulsified metal surfaces are thus exposed to an equal and continuous flow of active acid.

That portion near the center of an exposed dot is eaten away at a greater rate than at the periphery since, in the center, the bare metal is exposed to more acid from each direction. The metal is protected in direct proportion to its proximity to the emulsion. Thus, the depression has less depth as it nears the emulsion, forming a regular sectional radius around the etched depression. It now becomes apparent why the dots must be so small. If large, the center portion of the etched depression would be flat. Being small, the perimetral radius nearly, if not quite, eliminates a central flat portion (Fig. 5).

The second etch, which goes beyond the process used in normal photo-engraving, can be done with the same apparatus as previously. The etching is continued at short intervals, say of fifteen seconds. Now, however, the acid, eating away the depressions concentrically, cuts under the emulsion 6 as the depressions increase in diameter. When the plate is removed, it is rinsed clean, dried and the overhanging emulsion is removed by a light rubbing with a felt eraser dipped in precipitated chalk. Care must be exercised not to break the emulsion from the unetched metal, and it should be examined for breaks after each dip. During this etch, the sides of the widening circular depressions intersect and leave triangular islands of emulsion at the intersections of three adjacent depressions. These triangular areas are finally reduced to points. Since the acid eats away the metal at an equal rate from all points of contact, the ridges formed between two depressions, and the points remain sharply defined and intact (Fig. 6) even without any protective emulsion.

Just at the end of etch II (Fig. 6), that is when the emulsion and the original surface are entirely eaten away, the depth of the depressions is maximum. From Fig. 6 it is clear that further etching will increase the spherical radius of the depressions, thus decreasing their depth point to point since each lens, no matter how great its radius, occupies the same area. The depth, of course, is determined by the design of the lens, and etch III is carried on in increasingly short steps alternated by careful examinations with a microscope and a depth gauge, until a depth is achieved which makes allowance for the lens design and whatever other changes are to be made in the plate.

The etched plate thus obtained is of great uniformity and the contour of the lenses is extremely close to the required spherical shape. There is, however, a minute surface granularity, a "frostiness," remaining as the inherent result of the acid etching. Without rounding the points or edges, this surface can be notably improved by a carefully controlled application of the usual electrolytic polishing process. As shown in Fig. 7, the copper plate 7 after the third etch is in the form of a mold having spherical depressions 9 with hexagonal openings 10 at the upper surface of the copper plate which are contiguous to one another, each opening being in contact with the hexagonal openings adjacent thereto along the lines which define the openings.

Because entire uniformity and exact profile are most important where optical use is contemplated, an additional step can be added here, although it is entirely optional. It consists of hobbing out each individual depression with great care not to displace the metal of one depression at the cost of the adjacent depressions and it is done as follows. A steel plate 11 is emulsified exactly like the copper plate and on it is photographed the same design at exactly three times the scale of the copper plate. This plate is etched to the extent of each I of Fig. 5. The plate is then magnetized and steel ball bearings 12 of the diameter of the required lenses are poured on the surface. These seat themselves in the depressions as shown in Fig. 8. Because the depressions of the copper plate 7 are so close, only every third depression can hold a bearing without hitting adjacent bearings. The platen thus formed is carefully aligned to the etched copper plate 7 which is set above it, and under heavy pressure in a press equipped with stops to prevent too deep a pressing, the bearings hob out the depressions 9 of the copper, increasing their smoothness and sphericity. This is repeated two more times to treat all of the copper depressions equally. This process has the great advantage of sharpening the ridges between the lenses, thus increasing the efficiency of the resulting raster.

It may be found that, in etching, it is impossible to carry the last etch far enough to get the reduced depth required without also rounding the intersecting points and ridges. If so, it is possible to smooth the depresisons as well as to decrease their depth without impairing their sphericity by the careful application of a dilute thermosetting resin. In carrying out this step, the plate is set absolutely horizontal in a transparent vacuum chamber which sets on a controllable hot plate. The resin is introduced by a pipette arrangement whose end is near to and directly over the center of the plate. Bakelite varnish in ethyl alcohol can be used. The solution should be extremely thin in the order of 1 part varnish to 100 parts ethyl alcohol. The surface of the plate is then flooded with this liquid without permitting it to overflow the edges. The alcohol, under vacuum, quickly evaporates and the remaining resin, by capillarity, is deposited in a layer 13 that is thicker at the base of every depression without impairing the sharpness of the ridges, or the sphericity of the depressions as shown in Fig. 9. By heating the plate, still in the vacuum, the resin can then be cured to hardness. Several applications of resin may be necessary to obtain the exact contour required and to get a specular surface to the depressions. One application can be counted to reduce the depth of a depression about one quarter of a thousandth of an inch (.00025").

The hobbing and the resin applications are designed to increase the accuracy of the platen, but unless the accuracy required is of the highest degree, both can be omitted.

In producing the desired raster screens, the etched and polished plate 7 is set in a press opposite a specular platen 14. A sheet of clear plastic 15 suitable for pressure molding is then prepared for use by overlaying it with a thin gauge material such as cellophane or "Saran." This thin gauge might be omitted if the plate has been previously swedged or varnished. The overlaid plastic sheet is placed over the etched plate and is then heated to about 350° F. and pressed at about five thousand p. s. i. After the pressing operation, the overlaid sheeting is stripped from the plastic, leaving a lenticular surface having a multitude of optically specular lenses. The thin gauge material, under the heat and pressures involved, thins out on the ridges so that, in designing the plate, the depressions should be .0005" deeper than the required lenses of the raster.

The description set forth above of the process of the present invention covers broadly the combination of steps for producing the unique hexagonal lens raster screen of the present invention. In carrying out the steps of this process, it will be understood that certain variations and modifications may be employed. However, there are certain general principles which are applicable to such variations. One such consideration is that the diameter of each lens of the raster screen is ideally from about ¼ to ⅙ of the focal length of the lenses. Therefore, the proper depth is related to the lens diameter, since, for normal photographic purposes the photographic emulsion would be positioned on the surface of the plastic sheet opposite to the lenticulated surface. The thickness of the transparent plastic sheet from which the ultimate raster screen is made is selected in a range which is thick enough to have sufficient body and thin enough so that it is acceptable from point of view of price. Thicknesses ranging from .015" to .060" meet these requirements, but it will be understood that sheets somewhat thinner or thicker may be used in the practice of the present invention. With plastic sheets of this thickness the diameters of the lenses are from about .00375" to about .015". In a hexagonal arrangement, the diameter referred to is the diameter of the circle in which the hexagon is inscribed.

In carrying out the present invention, I have found that a suitable depth for the depressions formed in the copper plate is about .0025" where the dots are 1/65" in diameter, and where the plastic from which the lenticular raster screen is made has an index of refraction of 1.475, and in making allowance for the interlayer of thin gauge plastic which is described above.

To check the accuracy of a plate, it is necessary to make a number of accurate pressings in plastic from it as described, and to use carefully graded stops in the press to form the gauge raster required as well as slightly thinner and thicker plates. With a good microscope, the lenses, against the rear surface of the raster, should, in front of an object set at about a foot distant, reveal a clear, reversed image in each lens. To gauge overall accuracy, a print on stiff glazed paper should be made from the original plate after the first etch. This, overlaid by each trial raster screen, face up and twisted axially, the printed pattern of dots will appear very much magnified by the creation of a cumulative image. When the plastic is pressed very close to the print and this pattern is in sharp black and white contrast with no fuzziness or grayness, the raster is in good focus.

A final check of the most accurate sheet is to make a number of them emulsify the reverse surface and, by integral photography, photograph various objects at different distances. The resolution of the developed photograph is a clear indication of the screen's accuracy and quality.

Having thus determined that the etched plate produces the desired raster screen, it remains to make a number of dies from it that have specular depressions, without need of the interposition of the thin gauge plastic. The first step is to press several sheets of heavy gauge thermoplastic, say .250" thick on the etched plate in the manner described and with the thin gauge plastic used to give them as specular a surface as the tested and approved sample. These sheets are then coated by a microscopically thin coat of gold or silver on the lenticular surfaces by the method known as vacuum deposit. This metallizing permits the building up, by electrolysis of a heavy metal coating which is first chrome or another metal permitting heavy pressures over long production runs. A surface deposit of this metal need be no thicker than 1/8". A second layer of metal, necessary to give body and rigidity to the die, can be of copper. The total thickness should be about 3/8" if the platen is as large as 20" x 25". The metal deposited on the plastic, before the plastic has been removed from the way in which it has been set for the electrolytic bath, should be machined off so that the rear surface of the metal is precisely flat and exactly parallel with the lenticular surface. This done, the way is removed, the assembly of plastic and metal cleaned of metal overlapping the sides of the plastic, and the whole placed in an oven at the forming temperature, 350° F., of the plastic. The sheet of plastic will then flatten out, releasing the die. Several such dies, made in this fashion from the several sheets of plastic, can be used in multiple pressings.

For later purposes, it is required that two raster screens be most accurately aligned, one behind the other. To obtain this, points of registration should be marked on the edges of the original etched plate so that they are finally reproduced on the dies and thus on all the screens produced.

It will be understood that transparent plastic sheets of any type may be used having reference in their design to the plastic index of refraction. It is also possible to have screens of either one or two lenticulated surfaces. Finally, it is also possible to produce these screens by compression molding or by injection molding.

Having thus described my invention, I claim:

1. In a process for producing a raster screen mold, the steps of forming on a metallic surface an acid resistant coating having a multiplicity of openings forming a pattern in which the openings are positioned at the jointures of a plurality of contiguous equilateral triangles, subjecting the metallic surface and the said coating to repeated etching actions, thereby forming spherical depressions in the metal surface and forming overhanging portions in the coating, removing said overhanging portions, and repeating said etching action and said overhang removal until the openings of the spherical depressions are contiguous and substantially hexagonal in outline and said acid resistant coating has been removed.

2. In a process for producing a raster screen mold, the steps of photo-engraving on a light sensitive acid resistant emulsion on a metallic plate a pattern of openings positioned at the jointures of a plurality of contiguous equilateral and equidimensional triangles, subjecting the metallic plate and the said emulsion to repeated etching actions with an acid, forming spherical depressions in the metal surface and forming overhanging portions in the emulsion, removing said overhanging portions, and repeating said etching action and said overhang removal until the openings are transformed to spherical depressions having contiguous and substantially hexagonal outlines.

3. The process of claim 2 further characterized by the step of hobbing out the said depressions, after they have been transformed to spherical depressions having contiguous and substantially hexagonal outlines by subjecting them to the action of metallic balls.

4. The process of claim 2 further characterized by the steps of positioning the etched plate horizontally in a vacuum chamber, flooding the etched plate with varnish dissolved in alcohol and then heating the plate while still in the vacuum chamber.

5. The process of claim 1 further characterized by subjecting the metallic surface to further repeated etching actions subsequent to the removal of said acid resistant coating, thereby increasing the spherical radius of the said spherical depressions and decreasing their depth point to point.

References Cited in the file of this patent

UNITED STATES PATENTS

| | | |
|---|---|---|
| 1,849,036 | Ernst | Mar. 8, 1932 |
| 2,332,003 | New | Oct. 19, 1943 |

FOREIGN PATENTS

| | | |
|---|---|---|
| 211,486 | Great Britain | Feb. 19, 1925 |
| 246,829 | Great Britain | June 20, 1927 |
| 495,100 | Great Britain | 1938 |

UNITED STATES PATENT OFFICE
CERTIFICATE OF CORRECTION

September 30, 1958

Patent No. 2,854,337

Henry F. Pearson

It is hereby certified that error appears in the printed specification of the above numbered patent requiring correction and that the said Letters Patent should read as corrected below.

Column 4, line 1, for "each" read -- etch --; line 20, for "depresisons" read -- depressions --.

Signed and sealed this 17th day of February 1959.

(SEAL)
Attest:
KARL H. AXLINE
Attesting Officer

ROBERT C. WATSON
Commissioner of Patents